(12) United States Patent
Diehl et al.

(10) Patent No.: US 10,300,397 B2
(45) Date of Patent: May 28, 2019

(54) ASSEMBLY TO CONTROL OR GOVERN RELATIVE SPEED OF MOVEMENT BETWEEN PARTS

(71) Applicant: EDDY CURRENT LIMITED PARTNERSHIP, Wellington (NZ)

(72) Inventors: Andrew Karl Diehl, Christchurch (NZ); Kevin A. Wright, Christchurch (NZ)

(73) Assignee: Eddy Current Limited Partnership, Wellington (NZ)

( * ) Notice: Subject to any disclaimer, the term of this patent is extended or adjusted under 35 U.S.C. 154(b) by 11 days.

(21) Appl. No.: 15/104,949

(22) PCT Filed: Dec. 16, 2014

(86) PCT No.: PCT/NZ2014/000245
§ 371 (c)(1),
(2) Date: Jun. 15, 2016

(87) PCT Pub. No.: WO2015/093983
PCT Pub. Date: Jun. 25, 2015

(65) Prior Publication Data
US 2016/0317936 A1      Nov. 3, 2016

(30) Foreign Application Priority Data

Dec. 16, 2013    (NZ) ........................ 619034

(51) Int. Cl.
*A62B 1/06*    (2006.01)
*A63G 21/20*    (2006.01)
(Continued)

(52) U.S. Cl.
CPC .......... *A63G 21/20* (2013.01); *A62B 35/0093* (2013.01); *H02K 49/043* (2013.01); *H02K 2213/03* (2013.01)

(58) Field of Classification Search
CPC ........ H02K 49/043; B61H 9/02; A63G 21/20; A62B 1/08
(Continued)

(56) References Cited

U.S. PATENT DOCUMENTS 2,058,024 A * 10/1936 Logan, Jr. ............ H02K 49/043
310/93
2,122,312 A    6/1938 Cassion
(Continued)

FOREIGN PATENT DOCUMENTS

CN    1783674 A    6/2006
CN    202203305 U    4/2012
(Continued)

OTHER PUBLICATIONS

PCT International Search Report and Written Opinion, dated Mar. 11, 2015.
(Continued)

*Primary Examiner* — Christopher P Schwartz
(74) *Attorney, Agent, or Firm* — Craig J. Lervick; Larkin Hoffman Daly & Lindgren, Ltd.

(57) ABSTRACT

Described herein is an assembly and methods of use thereof for controlling or governing the relative speed of motion between the assembly parts via eddy current formation. The assembly and methods also may minimize the number of parts required and may minimize the number of moving parts thereby increasing the mechanical durability of the assembly compared to art designs that may have more moving parts and greater part complexity.

18 Claims, 11 Drawing Sheets

(51) Int. Cl.
*A62B 35/00* (2006.01)
*H02K 49/04* (2006.01)

(58) Field of Classification Search
USPC ......... 188/65.1–65.5, 156–164, 267; 310/77,
310/93, 103, 105; 254/269, 274, 276,
254/323; 192/3.31, 84.1, 84.8; 182/232,
182/234
See application file for complete search history.

(56) References Cited

U.S. PATENT DOCUMENTS

| | | | |
|---|---|---|---|
| 2,122,315 A | 6/1938 | Fosty et al. | |
| 2,409,009 A | 10/1946 | Bakke | |
| 2,428,104 A * | 9/1947 | Winther | H02K 49/043 310/105 |
| 2,492,776 A * | 12/1949 | Winther | H02K 49/043 310/93 |
| 2,771,171 A | 11/1956 | Schultz | |
| 2,807,734 A * | 9/1957 | Lehde | H02K 49/02 310/103 |
| 3,364,795 A | 1/1968 | De Coye De Castelet | |
| 3,447,006 A | 5/1969 | Bair | |
| 3,721,394 A | 3/1973 | Reiser | |
| 3,868,005 A * | 2/1975 | McMillan | D06F 37/36 192/105 CS |
| 3,962,595 A | 6/1976 | Eddens | |
| 3,967,794 A | 7/1976 | Fohl | |
| 4,078,719 A | 3/1978 | Durland et al. | |
| 4,093,186 A | 6/1978 | Golden | |
| 4,224,545 A | 9/1980 | Powell | |
| 4,271,944 A | 6/1981 | Hanson | |
| 4,306,688 A | 12/1981 | Hechler, IV | |
| 4,416,430 A | 11/1983 | Totten | |
| 4,434,971 A | 3/1984 | Cordrey | |
| 4,544,111 A | 10/1985 | Nakajima | |
| 4,561,605 A | 12/1985 | Nakajima | |
| 4,567,963 A | 2/1986 | Sugimoto | |
| 4,612,469 A | 9/1986 | Muramatsu | |
| 4,676,452 A * | 6/1987 | Nakajima | A01K 89/01555 242/288 |
| 4,690,066 A | 9/1987 | Morishita et al. | |
| 4,938,435 A | 7/1990 | Varner et al. | |
| 4,957,644 A | 9/1990 | Price et al. | |
| 5,054,587 A | 10/1991 | Matsui et al. | |
| 5,064,029 A | 11/1991 | Araki et al. | |
| 5,205,386 A | 4/1993 | Goodman et al. | |
| 5,342,000 A | 8/1994 | Berges et al. | |
| 5,441,137 A | 8/1995 | Organek et al. | |
| 5,465,815 A | 11/1995 | Ikegami | |
| 5,477,093 A * | 12/1995 | Lamb | H02K 49/046 310/75 D |
| 5,636,804 A | 6/1997 | Jeung | |
| 5,692,693 A | 12/1997 | Yamaguchi | |
| 5,711,404 A | 1/1998 | Lee | |
| 5,712,520 A | 1/1998 | Lamb | |
| 5,722,612 A | 3/1998 | Feathers | |
| 5,742,986 A | 4/1998 | Corrion et al. | |
| 5,779,178 A | 7/1998 | McCarty | |
| 5,791,584 A | 8/1998 | Kuroiwa | |
| 5,822,874 A | 10/1998 | Nemes | |
| 5,862,891 A | 1/1999 | Kroger et al. | |
| 5,928,300 A | 7/1999 | Rogers et al. | |
| 6,041,897 A | 3/2000 | Saumweber et al. | |
| 6,042,517 A | 3/2000 | Gunther et al. | |
| 6,051,897 A | 4/2000 | Wissler et al. | |
| 6,062,350 A | 5/2000 | Spieldiener et al. | |
| 6,086,005 A | 7/2000 | Kobayashi et al. | |
| 6,279,682 B1 | 8/2001 | Feathers | |
| 6,293,376 B1 | 9/2001 | Pribonic | |
| 6,412,611 B1 | 7/2002 | Pribonic | |
| 6,460,828 B1 | 10/2002 | Gersemsky et al. | |
| 6,523,650 B1 | 2/2003 | Pribonic et al. | |
| 6,533,083 B1 | 3/2003 | Pribonic et al. | |
| 6,557,673 B1 | 5/2003 | Desta et al. | |
| 6,561,451 B1 | 5/2003 | Steinich | |
| 6,659,237 B1 | 12/2003 | Pribonic | |
| 6,756,870 B2 | 6/2004 | Kuwahara | |
| 6,793,203 B2 | 9/2004 | Heinrichs et al. | |
| 6,810,997 B2 | 11/2004 | Schreiber et al. | |
| 6,918,469 B1 | 7/2005 | Pribonic et al. | |
| 6,962,235 B2 | 11/2005 | Leon | |
| 6,973,999 B2 | 12/2005 | Ikuta et al. | |
| 7,011,607 B2 | 3/2006 | Kolda et al. | |
| 7,014,026 B2 | 3/2006 | Drussel et al. | |
| 7,018,324 B1 | 3/2006 | Lin | |
| 7,279,055 B2 | 10/2007 | Schuler | |
| 7,281,612 B2 | 10/2007 | Hsieh | |
| 7,513,334 B2 | 4/2009 | Claver | |
| 7,528,514 B2 | 5/2009 | Cruz et al. | |
| 7,984,796 B2 | 7/2011 | Pribonic | |
| 8,272,476 B2 | 9/2012 | Hartman et al. | |
| 8,424,460 B2 | 4/2013 | Lerner et al. | |
| 8,490,751 B2 * | 7/2013 | Allington | A62B 1/08 182/234 |
| 8,511,434 B2 | 8/2013 | Blomberg | |
| 8,556,234 B2 | 10/2013 | Hartman et al. | |
| 8,567,561 B2 | 10/2013 | Strasser et al. | |
| 8,601,951 B2 | 12/2013 | Lerner | |
| 8,851,235 B2 | 10/2014 | Allington et al. | |
| 9,016,435 B2 | 4/2015 | Allington et al. | |
| 9,199,103 B2 | 12/2015 | Hetrich et al. | |
| 9,242,128 B2 | 1/2016 | Macy | |
| 2002/0162477 A1 | 11/2002 | Palumbo | |
| 2002/0179372 A1 | 12/2002 | Schreiber et al. | |
| 2003/0116391 A1 | 6/2003 | Desta et al. | |
| 2003/0211914 A1 | 11/2003 | Perkins et al. | |
| 2004/0055836 A1 | 3/2004 | Pribonic et al. | |
| 2004/0073346 A1 | 4/2004 | Roelleke | |
| 2004/0168855 A1 | 9/2004 | Leon | |
| 2004/0191404 A1 | 9/2004 | Bytnar et al. | |
| 2005/0117258 A1 | 6/2005 | Ohta et al. | |
| 2005/0189830 A1 | 9/2005 | Corbin, III et al. | |
| 2005/0263356 A1 | 12/2005 | Marzano et al. | |
| 2006/0278478 A1 | 12/2006 | Pribonic et al. | |
| 2007/0000741 A1 | 1/2007 | Pribonic et al. | |
| 2007/0001048 A1 | 1/2007 | Wooster et al. | |
| 2007/0135561 A1 | 6/2007 | Rath et al. | |
| 2007/0228202 A1 | 10/2007 | Scharf et al. | |
| 2007/0228713 A1 | 10/2007 | Takemura | |
| 2007/0259606 A1 | 11/2007 | Jin et al. | |
| 2008/0059028 A1 | 3/2008 | Willerton | |
| 2008/0074223 A1 | 3/2008 | Pribonic | |
| 2008/0087510 A1 | 4/2008 | Pribonic | |
| 2008/0105503 A1 | 5/2008 | Pribonic | |
| 2008/0106420 A1 | 5/2008 | Rohlf | |
| 2008/0135579 A1 | 6/2008 | Bertram et al. | |
| 2009/0026303 A1 | 1/2009 | Schmitz et al. | |
| 2009/0032785 A1 | 2/2009 | Jones | |
| 2009/0084883 A1 | 4/2009 | Casebolt et al. | |
| 2009/0114892 A1 | 5/2009 | Lesko | |
| 2009/0166459 A1 | 7/2009 | Niitsuma et al. | |
| 2009/0178887 A1 | 7/2009 | Reeves et al. | |
| 2009/0211846 A1 | 8/2009 | Taylor | |
| 2010/0032255 A1 | 2/2010 | Conti et al. | |
| 2010/0065373 A1 | 3/2010 | Stone et al. | |
| 2010/0112224 A1 | 5/2010 | Lott | |
| 2010/0116922 A1 | 5/2010 | Choate et al. | |
| 2010/0211239 A1 | 8/2010 | Christensen et al. | |
| 2011/0084158 A1 | 4/2011 | Meillet et al. | |
| 2011/0114907 A1 | 5/2011 | Hartman et al. | |
| 2011/0147125 A1 * | 6/2011 | Blomberg | H02K 49/043 182/232 |
| 2011/0174914 A1 | 7/2011 | Yang | |
| 2011/0175473 A1 | 7/2011 | Kitabatake et al. | |
| 2011/0240403 A1 | 10/2011 | Meillet | |
| 2011/0297778 A1 | 12/2011 | Meillet et al. | |
| 2012/0055740 A1 | 3/2012 | Allington et al. | |
| 2012/0118670 A1 * | 5/2012 | Olson | A62B 1/10 182/232 |
| 2012/0312540 A1 * | 12/2012 | Lefebvre | E21B 43/20 166/319 |
| 2013/0048422 A1 | 2/2013 | Hartman et al. | |
| 2013/0087433 A1 | 4/2013 | Sejourne | |

(56) References Cited

U.S. PATENT DOCUMENTS

| | | | |
|---|---|---|---|
| 2013/0118842 A1* | 5/2013 | Lerner | B61H 9/02 188/62 |
| 2013/0186721 A1 | 7/2013 | Bogdanowicz et al. | |
| 2014/0048639 A1* | 2/2014 | Allington | A62B 1/08 242/396 |
| 2014/0110947 A1 | 4/2014 | Mongeau | |
| 2014/0224597 A1 | 8/2014 | Takezawa et al. | |
| 2014/0346909 A1 | 11/2014 | Vogler et al. | |
| 2014/0375158 A1 | 12/2014 | Allington et al. | |
| 2015/0196820 A1 | 7/2015 | Allington et al. | |
| 2015/0266454 A1 | 9/2015 | McGowan | |
| 2015/0352380 A1 | 12/2015 | Huang et al. | |
| 2016/0317936 A1 | 11/2016 | Diehl et al. | |
| 2016/0360738 A1 | 12/2016 | Richardson | |
| 2017/0237313 A1 | 8/2017 | Diehl et al. | |
| 2017/0244313 A1 | 8/2017 | Diehl et al. | |
| 2017/0274261 A1 | 9/2017 | Allington et al. | |
| 2017/0328424 A1 | 11/2017 | Allington et al. | |
| 2017/0338728 A1 | 11/2017 | Diehl et al. | |

FOREIGN PATENT DOCUMENTS

| | | | |
|---|---|---|---|
| CN | 102497085 A | | 6/2012 |
| CN | 102627063 A | | 8/2012 |
| CN | 103244577 A | | 8/2013 |
| CN | 103326538 A | | 9/2013 |
| DE | 9300966 U1 | | 3/1993 |
| DE | 102005032694 A1 | | 1/2007 |
| EP | 0460494 A1 | | 12/1991 |
| EP | 1244565 A1 | | 10/2002 |
| EP | 1401087 A1 | | 3/2004 |
| EP | 1432101 A1 | | 6/2004 |
| EP | 1564868 A1 | | 8/2005 |
| EP | 148032 B1 | | 7/2008 |
| GB | 721748 A | | 1/1955 |
| GB | 908128 A | | 10/1962 |
| GB | 2352644 A | | 2/2001 |
| GB | 2352784 A | | 2/2001 |
| GB | 2357563 A | | 6/2001 |
| GB | 2352645 B | | 1/2004 |
| JP | 5296287 A | | 11/1993 |
| JP | H05296287 A | | 11/1993 |
| JP | 8252025 A | | 10/1996 |
| JP | 1098868 A | | 4/1998 |
| JP | 10140536 A | | 5/1998 |
| JP | 10252025 A | | 9/1998 |
| JP | 11119680 A | | 4/1999 |
| JP | 11189701 A | | 7/1999 |
| JP | 11315662 A | | 11/1999 |
| JP | 2000316272 A | | 11/2000 |
| JP | 200117041 A | | 1/2001 |
| WO | 9516496 | | 6/1995 |
| WO | 9617149 | | 6/1996 |
| WO | 9847215 | | 10/1998 |
| WO | 0138123 A1 | | 5/2001 |
| WO | 03055560 A1 | | 7/2003 |
| WO | 2008139127 A1 | | 11/2008 |
| WO | 2009047469 A1 | | 4/2009 |
| WO | 2009108040 A1 | | 9/2009 |
| WO | 2009127142 A1 | | 10/2009 |
| WO | 2011079266 A2 | | 6/2011 |

OTHER PUBLICATIONS

Extended European Search Report; dated Jul. 11, 2017, pp. 1-10.
True Blue Auto Belays, Model TB150-12C Operator Manual, Jun. 20, 2013, 37 pages.
North Safety Products Europe B.V., "Climbing Wall Descender: FP2/5**GDD," Climbing Wall Descent Controllers Instruction Manual v3, Aug. 18, 2008, 20 pages.
MSA Safety Incorporated, Auto Belay Stop Use Notice, Oct. 15, 2009, http://verticalendeabors.com/minneapolis/auto-belay-stop-use-notice/,download date Apr. 6, 2017, 2 pages.
Extended European Search Report, European Patent Office, dated Jul. 11, 2017, pp. 1-10.

* cited by examiner

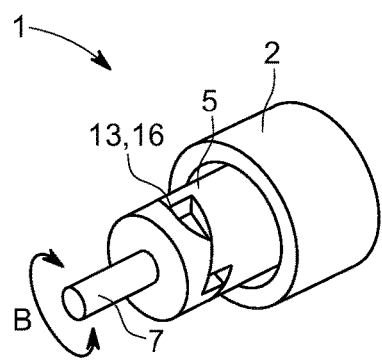
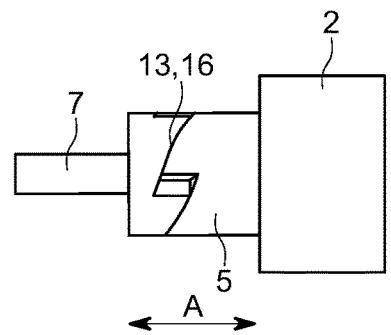
FIG. 2A  FIG. 2B
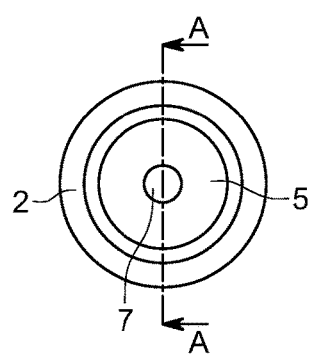
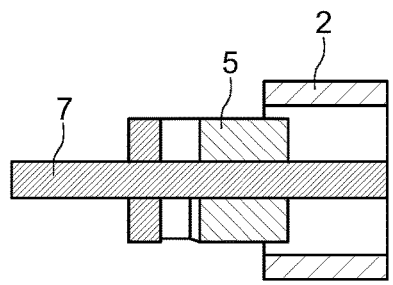
FIG. 2C  FIG. 2D

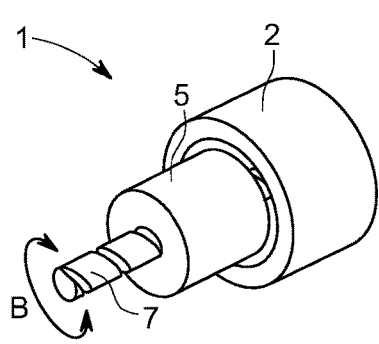
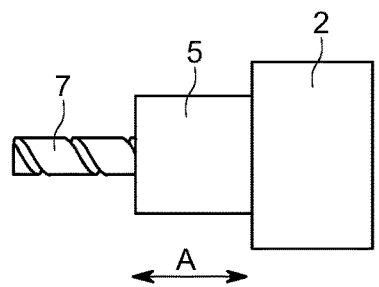
FIG. 3A  FIG. 3B
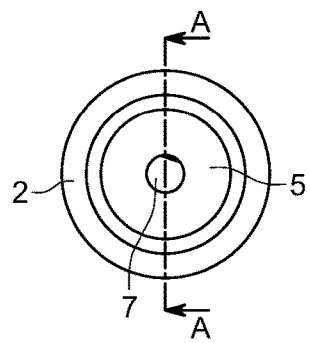
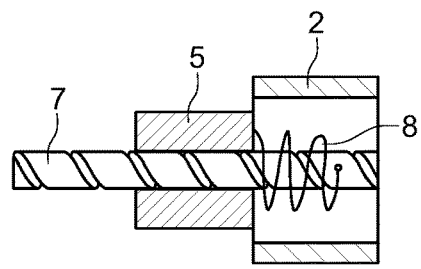
FIG. 3C  FIG. 3D

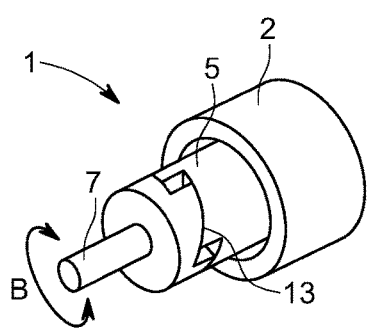
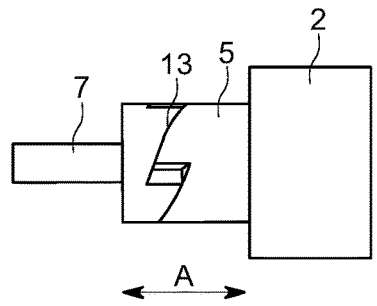
FIG. 5A    FIG. 5B
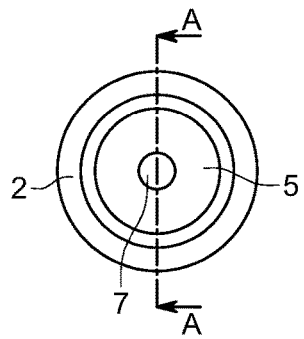
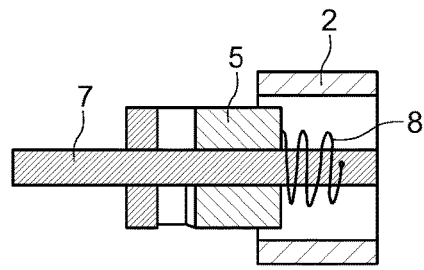
FIG. 5C    FIG. 5D

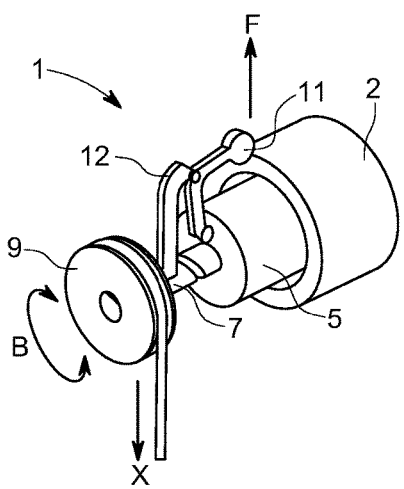
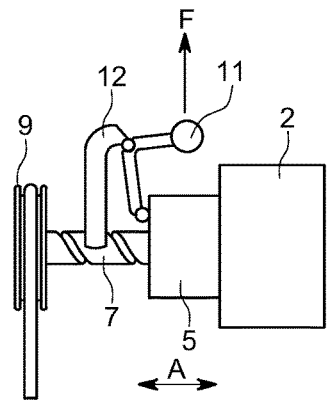
FIG. 6A    FIG. 6B
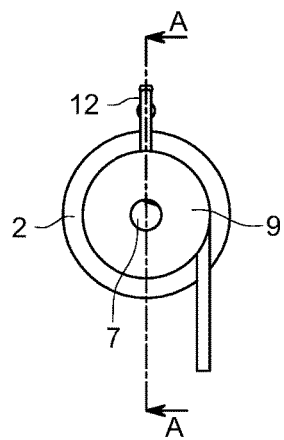
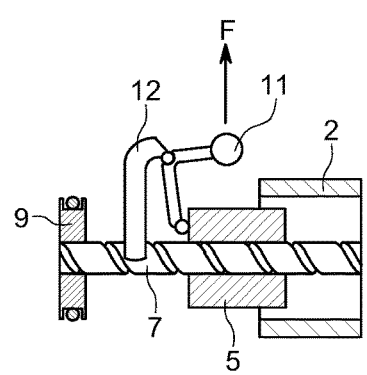
FIG. 6C    FIG. 6D

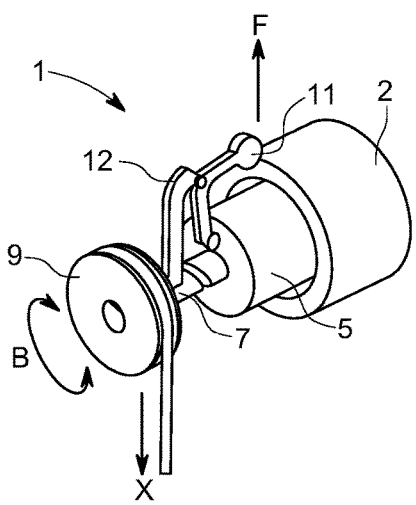
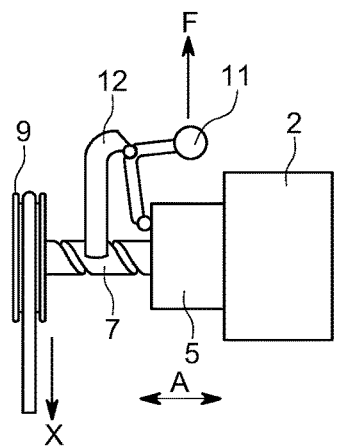
FIG. 7A                FIG. 7B
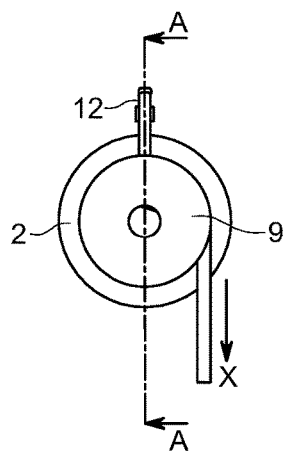
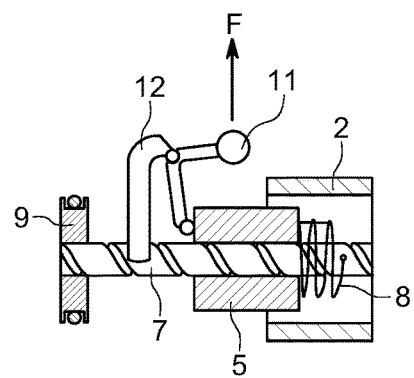
FIG. 7C                FIG. 7D

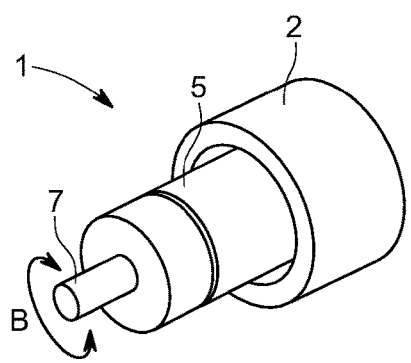
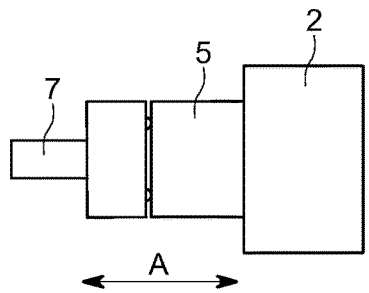
FIG. 8A  FIG. 8B
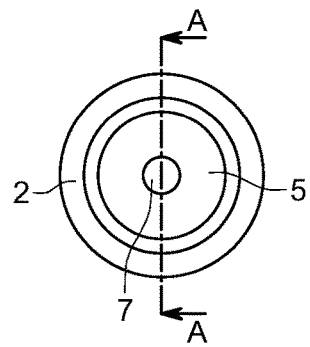
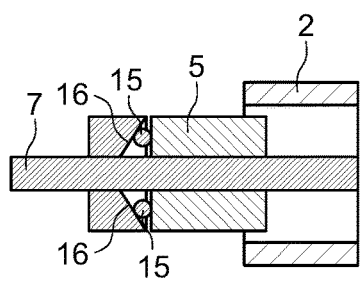
FIG. 8C  FIG. 8D

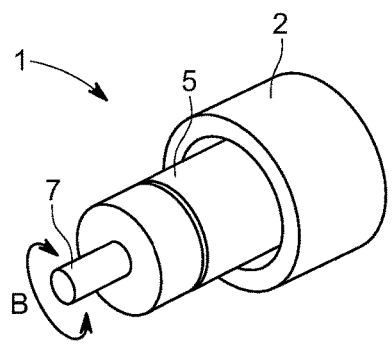
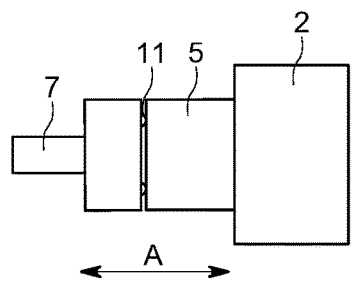
FIG. 9A  FIG. 9B
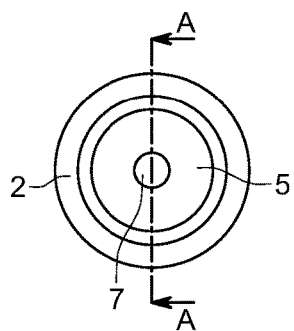
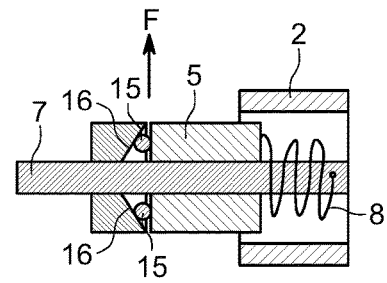
FIG. 9C  FIG. 9D

ASSEMBLY TO CONTROL OR GOVERN RELATIVE SPEED OF MOVEMENT BETWEEN PARTS

TECHNICAL FIELD

Described herein is an assembly to control or govern relative speed of movement between parts. More specifically, described herein is an assembly that uses eddy current formation to control or govern the relative speed of movement between two parts.

BACKGROUND ART

Eddy current formation may be used in a variety of ways to adjust the speed of rotation of a member. Various apparatus exist, for example in abseiling, to control the descent of a climber or for example, in personal protective equipment scenarios to prevent an injury causing fall. Other applications that use eddy current generation are in controlling payout of line in trains, cable cars, zip line devices and roller coasters.

One art device is published as US2012/0055740. This device utilises a rotor assembly. The rotors themselves may be conductive or magnetic or may have conductive or magnetic members attached thereto. When a rotational force is applied, the rotors move outwards from a central axis via centrifugal force and into a magnetic (or conductive) field. As the rotors move through the field, eddy currents are generated, the strength of which is proportional to the speed of rotation. As the speed of rotation reduces, the rotors are drawn back towards the axis of rotation via springs. This device is widely used however requires a number of moving parts. Another disadvantage is that, when the rotors move outwards and the field is generated, the magnetic field is not continuous around the circumference of the spin axis hence does not provide a continuous eddy current generation path.

As may be appreciated, reducing the number of parts in mechanical assemblies may be an advantage so as to reduce assembly cost. In addition, moving parts in mechanical assemblies generally require more maintenance and hence cost more. Minimising the number of moving parts may be advantageous. Maximising eddy current force generation may also be an advantage or at least it may be useful to provide the public with a choice.

Further aspects and advantages of the assembly and methods of use thereof will become apparent from the ensuing description that is given by way of example only.

SUMMARY

Described herein is an assembly and methods of use thereof for controlling or governing the relative speed of motion between the assembly parts via eddy current formation. The assembly and methods may also minimise the number of parts required and may minimise the number of moving parts thereby increasing the mechanical durability of the assembly compared to art designs that may have more moving parts and greater complexity.

In a first aspect, there is provided an assembly comprising:
a tube including a wall and void defined therein; and
a cylinder that fits into the tube void;
wherein, in use, the cylinder and tube have different relative speeds of rotation to each other and wherein the tube and cylinder or a part thereof interact to alter an eddy current induced braking force against different relative speed of motion with modulation of braking force arising due to a balance of the forces on the tube and cylinder.

In a second aspect there is provided an assembly substantially as described above wherein the axis and rotation of the tube and/or cylinder is linked to a shaft which may in turn be linked to a spool of line and wherein the speed control assembly regulates the speed of pay out of the line from the spool.

In a third aspect there is provided a method of braking the fall of an object by the step of linking the object or objects to a spool of line which in turn is linked to the assembly substantially as described above and allowing the object or objects to fall through gravity thereby creating a torque force on the shaft which in turn causes the speed control assembly to create a braking force on pay out of the line from the spool.

In a fourth aspect, there is provided a fall protection safety device including an assembly substantially as described above.

In a fifth aspect, there is provided an assembly substantially as described above wherein the assembly is incorporated into a zip line amusement ride to control the acceleration and deceleration of a suspended zip line passenger chair connected to a cable linked with the speed control system.

The inventor's have devised an apparatus where the various components interact to alter an eddy current induced braking force with modulation of braking force arising due to a balance of the forces on the tube and cylinder determining the extent of force applied.

Advantages of the above include the provision of an assembly and method with few moving parts that still provides an efficient use and transfer of eddy current forces to control or govern the relative speed of movement of parts in the assembly.

BRIEF DESCRIPTION OF THE DRAWINGS

Further aspects of the assembly and methods of use thereof will become apparent from the following description that is given by way of example only and with reference to the accompanying drawings in which:

FIG. 2 illustrates a perspective view [FIG. 2A], a side view [FIG. 2B], a front view [FIG. 2C] and a side section view [FIG. 2D] along section line AA of an alternative embodiment of the assembly using a driving ramp on the shaft with the parts in a partial braking alignment;

FIG. 3 illustrates a perspective view [FIG. 3A], a side view [FIG. 3B], a front view [FIG. 3C] and a side section view [FIG. 3D] along section line AA of an alternative embodiment of the assembly using a bias mechanism;

FIG. 5 illustrates a perspective view [FIG. 5A], a side view [FIG. 5B], a front view [FIG. 5C] and a side section view [FIG. 5D] along section line AA of an alternative embodiment of the assembly using a driving ramp on the shaft and bias mechanism with the parts in a partial braking alignment;

FIG. 6 illustrates a perspective view [FIG. 6A], a side view [FIG. 6B], a front view [FIG. 6C] and a side section view [FIG. 6D] along section line AA of one embodiment of the assembly using a lead screw shaft and a weight with the parts in a partial braking alignment;

FIG. 7 illustrates a perspective view [FIG. 7A], a side view [FIG. 7B], a front view [FIG. 7C] and a side section view [FIG. 7D] along section line AA of one embodiment of the assembly using a lead screw shaft, weight and bias mechanism with the parts in a partial braking alignment;

FIG. 8 illustrates a perspective view [FIG. 8A], a side view [FIG. 8B], a front view [FIG. 8C] and a side section view [FIG. 8D] along section line AA of one embodiment of the assembly using a ramp and weight arrangement with the parts in a partial braking alignment;

FIG. 9 illustrates a perspective view [FIG. 9A], a side view [FIG. 9B], a front view [FIG. 9C] and a side section view [FIG. 9D] along section line AA of one embodiment of the assembly using a ramp, weight arrangement and bias mechanism with the parts in a partial braking alignment;

DETAILED DESCRIPTION

Figure 1A:
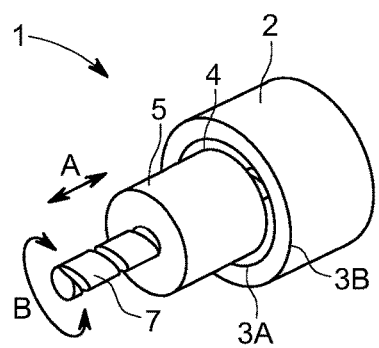
FIG. 1 illustrates a perspective view [FIG. 1A], a side view [FIG. 1B], a front view [FIG. 1C] and a side section view [FIG. 1D] along section line AA of one embodiment of the assembly using a lead screw shaft with the parts in a non-braking alignment.
Figure 1B:
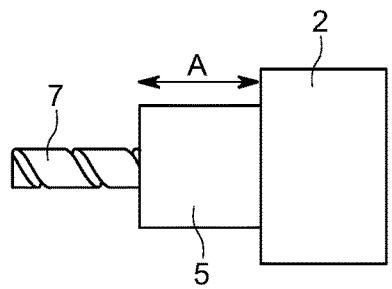
Figure 1C:
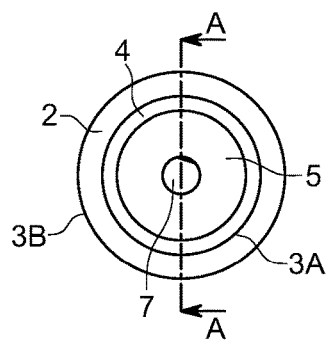
Figure 1D:
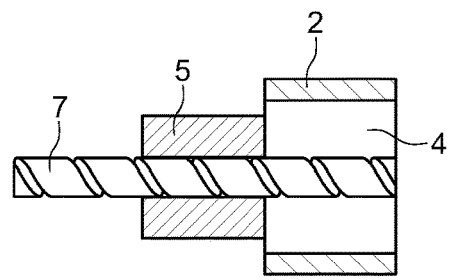

As noted above, described herein is an assembly and methods of use thereof for controlling or governing the relative speed of motion between the assembly parts via eddy current formation. The assembly and methods also may minimise the number of parts required and may minimise the number of moving parts thereby increasing the mechanical durability of the assembly compared to art designs that may have more moving parts and greater part complexity.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'tube' and grammatical variations thereof may in one embodiment refer to a cylindrical element having a circular hole or void that a circular cylinder mates with but also could be a square exterior tube wall and circular void or a polygonal tube wall (interior and exterior) or a frusto-conical tube wall.

The term 'cylinder' and grammatical variations thereof may refer to various shapes, a key criteria being the ability of the cylinder to move axially and/or rotationally relative to the tube void space or vice versa i.e. the tube may also move axially and/or rotationally relative to the cylinder. Note that the cylinder need not be solid and may have a void space or spaces therein.

In a first aspect, there is provided an assembly comprising:
a tube including a wall and void defined therein; and
a cylinder that fits into the tube void;
wherein, in use, the cylinder and tube have different relative speeds of rotation to each other and wherein the tube and cylinder or a part thereof interact to alter an eddy current induced braking force against different relative speed of motion with modulation of braking force arising due to a balance of the forces on the tube and cylinder.

The inventor's have devised an apparatus where the various components interact to alter an eddy current induced braking force with modulation of braking force arising due to a balance of the forces on the tube and cylinder determining the extent of force applied.

The cylinder may move relative to the tube via two separate degrees of movement being:
(a) axial translation of the cylinder relative to the tube so that the cylinder can pass at least partially into or out of the tube void; and
(b) rotation of the cylinder relative to the tube about a longitudinal axis, the axis passing through the tube void.

Alternatively, the tube may move relative to the cylinder via two separate degrees of movement being:
(a) axial translation of the tube relative to the cylinder so that the cylinder can pass at least partially into or out of the tube void; and
(b) rotation of the tube relative to the cylinder about a longitudinal axis, the axis passing through the tube void.

Coupled to the tube and cylinder may be one or more conductive members and one or more magnetic members, the tube and cylinder each having either magnetic member(s) or conductive member(s) and the conductive members and magnetic members orientated to interact with each other.

The tube and cylinder may have a common axis of rotation. As noted above, the tube and cylinder may have varying cross sectional shapes and do not need to be circular. It is however anticipated that a circular void in the tube and similar mating circular cylinder cross-section would provide the greatest degree of efficiency hence this may be advantageous for most applications. With two nesting circular cross-sections, a common axis of rotation may be a useful feature.

The cylinder may rotate about a rotating member passing through the axis of rotation of the cylinder and tube. A rotating member may be a shaft, although other configurations may be possible. Other features may be included between the shaft and cylinder such as bearings. In an alternative embodiment, the tube may rotate about a rotating member such as a shaft.

The rotating member may include a helical groove in order to translate rotational movement of the member into linear movement of the cylinder. The helical groove pitch and/or lead may be varied in order to vary the brake response. The rotating member may be a lead screw. A helical groove may be used to control and/or drive axial movement of the cylinder. This is not essential as other methods may be used to control and drive axial movement such as different bias arrangements or different bearing face arrangements and a helical groove should not be seen as limiting.

The conductive member or members may be wider than the magnetic member or members. Whilst not essential, the greatest eddy current generation may occur when the conductive members are wider than the magnetic members so that a full-induced magnetic field is generated. Smaller conductive member regions may still be used but a smaller magnetic field may be generated in these circumstances leading to a reduced eddy current drag formation.

The gap between the magnetic and conductive members may be minimised in order to maximise the eddy current brake force. As may be appreciated, a large gap leads to a smaller magnetic field and less eddy current drag force generation. This may be advantageous in some circumstances however, to generate the greatest force for the least effort, a substantially small gap (less than approximately 5 mm, or 4 mm or 3 mm, or 2 mm, or less than 1 mm) may be useful.

The tube may be fixed in place and the cylinder may move axially and rotationally relative to the tube. Opposite movement may be useful for example having the tube move via a motor towards or away from the cylinder but an aim of the assembly described herein is to minimise the overall number of parts required and also to minimise the number of moving parts.

The cylinder may rotate at a different relative speed to the tube in a co-current or counter-current direction. As may be appreciated, of key importance to generating eddy currents is a different relative rotational speed between the conductive member and magnetic member. One means of achieving this is to have the conductive member being the tube and the magnetic member being the cylinder and having each member rotate at a different relative speed. As noted above, the tube may be fixed in place and not rotate at all. The tube may also rotate in either the same direction (but at a different speed to the cylinder) or may rotate in the opposite direction to the cylinder (in which case a stronger eddy current force might result due to a greater relative speed difference).

The cylinder may be at least partially outside of the tube when the cylinder and/or tube are not rotating. The cylinder may be at least partially inside the tube when the cylinder and/or tube are not rotating. Varying the position of the cylinder axially when the assembly is at rest may alter the characteristics at start up of rotation. For example, if the cylinder is already in the tube, immediate eddy current drag force generation will occur when the cylinder (or tube) rotates. If the cylinder is outside the tube when rotation commences, minimal immediate eddy current force will occur—this delayed effect might be useful where a small amount of rotation is desired such as when a slow payout of line is needed in a climbing application. When a fall occurs, the pay out of line becomes much faster and that faster rate of rotation may then cause engagement of the cylinder and tube via axial translation to generate a drag force and brake effect.

Varying the at least one magnet member strength and/or position on the cylinder or tube may vary the brake response. Varying the at least one conductive member chemical composition and/or position on the cylinder or tube may vary the brake response. To further illustrate this feature, some art eddy current devices use spaced apart conductive or magnetic members. The result of this may be a lower level of eddy current generation than a continuous field. For example, the conductive member(s) may be moving rotationally in and out of a magnetic field hence they may only be creating a smaller or less efficient eddy current drag force than if the field were continuous. In contrast the described arrangement of a tube and cylinder means it may be possible to generate a continuous field between the conductive and magnetic members due to the continuous nature of the tube void surface and cylinder surface. One example of a completely continuous eddy current generating relationship may be to have the cylinder made entirely from a conductive member or at least the outer surface of the cylinder being made from or containing an electrically conductive member and the tube itself or outer surface of the tube void being made from or containing a magnetic member. A continuous interface is then created between the two parts for eddy current generation. Variations on this may also be undertaken where a less than continuous interface is desired however, the ability to create a continuous surface may be unique and an advantage of this particular design.

Varying the relative speed of rotation of the tube and cylinder may vary the brake response. As noted above, relative speed is key in generating eddy currents. Assuming the axial position of the cylinder and tube does not change and the conductive and magnetic members positioning does not change, a next way of altering the eddy current characteristics may be to change the relative rotation speed.

At least part of the cylinder may contain or may be formed from electrically conductive material and may thereby form a conductive member. At least part of the tube may contain or may be formed from electrically conductive material and may thereby form a conductive member. Conductive members may be placed onto the surface of the cylinder or tube and similarly, magnetic members may be placed on the surface of the cylinder or tube. The tube or tube void wall may itself be a conductor or magnetic material as can the cylinder itself or cylinder exterior.

Axial movement of the tube and/or cylinder may be actuated via at least one motor. A motor may be avoided to minimise parts and minimise moving parts in the overall assembly although could be incorporated if desired.

The assembly may include a bias member that creates a direct or indirect axial force on the tube and/or cylinder, biasing the tube and/or cylinder together or apart on rotation of the tube and/or cylinder. The bias member may be a spring or springs.

Axial movement of the tube and/or cylinder may be generated when the tube and/or cylinder rotates, the axial movement caused by a translation of centrifugal energy into axial translation. The tube and/or cylinder may include at least one weight off-set from the axis of rotation, that, on rotation of the tube and/or cylinder, may be subject a centrifugal force and, via a kinematic relationship, translates the centrifugal force into an axial force on the tube and/or cylinder thereby causing relative axial movement of the tube and/or cylinder. A lever converting rotational movement of the weight to axial movement of the cylinder or tube may act to form the kinematic relationship. The weight or weights may move at least partially radially on application of a centrifugal force. In an alternative embodiment, centrifugal outward movement of the weight or weights may cause an axial movement of the cylinder by acting on a ramp arrangement.

The tube and/or cylinder may also be formed as multiple layers, the cylinder for example having a hollow interior and mating with a tube that has outer walls at least partly extending over the outside of the cylinder and internal walls extending into the cylinder hollow interior either before, during or after relative movement of the tube and cylinder. The tube and cylinder may have multiple nesting concentric walls. Magnets and/or conductive members may be located on the cylinder walls and/or one or more of the tube walls (outer and/or inner). In a further embodiment, the cylinder may have multiple concentric wall layers mating with multiple concentric wall layers on the tube and magnets and/or conductive members placed on some or all of the wall layers.

In a second aspect there is provided an assembly substantially as described above wherein the axis and rotation of the tube and/or cylinder is linked to a shaft which may in turn be linked to a spool of line and wherein the speed control assembly regulates the speed of pay out of the line from the spool.

The above assembly may include a retraction mechanism that retracts paid out line back onto the spool when a pay out force is removed.

The braking force applied to pay out of the spool of line may be at a substantially constant speed for extension over a range of applied torque.

The assembly as described above may include a housing, the housing enclosing at least a portion of the assembly. A housing may be useful to weather proof the assembly and also to improve the aesthetics of the assembly. A housing may also be important for safety to avoid accidental injury.

In a third aspect there is provided a method of braking the fall of an object by the step of linking the object or objects to a spool of line substantially as described above and allowing the object or objects to fall through gravity thereby creating a torque force on the shaft which in turn causes the speed control assembly to create a braking force on pay out of the line from the spool.

The braking force may also reduce retraction speed of the line enough to allow a fully extended line with nothing attached to the line to cleanly retract.

The range of applied torque may cover objects attached to the line weighing about 9, or 10, or 11, or 12, or 13, or 14, or 15, or 20, or 25, or 30, or 35, or 40, or 45, or 50, or 55, or 60, or 65, or 70, or 75, or 80, or 85, or 90, or 95, or 100, or 105, or 110, or 115, or 120, or 125, or 130, or 135, or 140, or 145, or 150 kilograms. The range may be from about 9 kg to about 150 kg.

In a fourth aspect, there is provided a fall protection safety device including an assembly substantially as described above.

In a fifth aspect, there is provided an assembly substantially as described above wherein the assembly is incorporated into a zip line amusement ride to control the acceleration and deceleration of a suspended zip line passenger chair connected to a cable linked with the speed control system.

To summarise, control or governance of the relative speed of the members using the device described may occur as per the two examples A and B below:

[A] In the embodiment of a cylinder interacting with a shaft and tube where:
  The two are connected in a manner wherein a kinematic relationship exists where relative rotation of the two along their axis is linked to a corresponding relative translational motion;
  Application of a torque on the shaft causes rotation of the shaft and thereby rotation of the cylinder;
  Rotation of the cylinder results in formation of a eddy current drag torque on the cylinder; and/or
  An inertial torque is generated by the cylinder due to an applied rotational acceleration of the shaft;
  The kinematic relationship provides a corresponding axial force on the cylinder;
  A biasing device may be connected between the shaft and cylinder whereby the bias is in relationship with the relative rotation of the shaft and cylinder, and the relative rotation of the cylinder and shaft reaches an equilibrium where the eddy drag torque and the inertial torque are balanced by the reaction torque of the bias device; or
  A biasing device is connected between the cylinder and a 'ground' body (possibly the tube or support structure), whereby the bias is in relationship with the relative translation of the shaft and cylinder, and the relative translation of the cylinder and shaft reaches an equilibrium where the induced axial force induced by the kinematic connection of the eddy drag torque and the inertial torque are balanced by the axial reaction force of the bias device; and
  The resulting equilibrium position of the shaft, cylinder, and tube provide a controlled eddy current induced braking torque based on the rotational speed and acceleration of the shaft; and
  The induced torque balances an applied torque.

[B] A cylinder interacting with a shaft wherein
  The two are connected in a manner wherein a kinematic relationship exists where relative translational motion is allowed and a centrifugal system is arranged to apply axial force on the cylinder upon rotation of the shaft; and
  A biasing device is connected between the cylinder and a 'ground' body (possibly the tube or support structure), whereby the bias is in relationship with the relative translation of the shaft and cylinder, and the relative translation of the cylinder and shaft reaches an equilibrium where the centrifugally induced axial force is balanced by the axial reaction force of the bias device; and
  The resulting equilibrium position of the shaft, cylinder, and tube provide a controlled eddy current induced braking torque based on the rotational speed and acceleration of the shaft; and
  The induced torque balances an applied torque.

Advantages of the above assembly include the ability to control or govern relative speed of motion between the parts in an efficient manner that may also minimise the number of parts required and may minimise the number of moving parts. Reducing the number of moving parts may increase the mechanical durability of the assembly since typically in mechanical devices, moving parts are where mechanical objects either fail or require maintenance (and hence cost more).

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

WORKING EXAMPLES

The above described assembly and methods of use are now described by reference to specific examples.

Example 1

Referring to FIGS. 1A-1D, one embodiment of the assembly is shown. The assembly 1 as illustrated includes a tube 2 with an inner 3A and outer wall 3B and a void 4 therein. The assembly 1 also includes a cylinder 5. The cylinder 5 moves relative to the tube 2 via two degrees of movement being an axial translation along arrow A into and out of the tube 2 void 4 and a rotational movement B relative to tube 2. Axial movement A can be completely or partially into or out of the void 4. In the embodiment illustrated, the tube 2 and cylinder 5 share a common central axis of rotation. The cylinder 5 may rotate in direction B about a shaft 7. The shaft 7 may have a helical groove thereon which, when the shaft 7 rotates in direction B, drives axial movement A of the cylinder 5 relative to the tube 2. The tube 2 and cylinder 5 may include one or more conductive members and magnetic members (not shown). In one embodiment, the conductive member(s) may be on the tube 2 or the tube 2 it self may be a conductive member and the magnetic member(s) may be on the cylinder 5 or the cylinder 5 itself may be a magnetic member. The opposite scenario may also be the case with the conductive member(s) on the cylinder 5 or the cylinder 5 it self may be a conductive member and the magnetic member (s) may be on the tube 2 or the tube 2 it self may be a magnetic member. In use, when the tube 2 and cylinder 5 have different relative speeds of rotation, eddy current drag forces are produced between the members 2, 5 resisting rotation when placed in close proximity. In one embodiment, the tube 2 may be fixed in position and the cylinder 5 rotates. When the cylinder 5 enters the tube 2, eddy current forces (not shown) create a drag force on rotation B of the cylinder 5 and the speed of rotation B reduces. As may be appreciated, an eddy current force does not necessarily stop all rotation B but arrests speed of rotation to a level related to the relative magnetic field produced by movement of the cylinder 5 in the tube 2 void 4. Fast relative rotational movement B may result in a strong brake force for example. In other embodiments, the tube 2 may also rotate in the same direction as the cylinder 5 (but at a different relative speed) or in a counter rotational direction to the cylinder 5.

A noted above, the shaft 7 may have a helical groove driving axial movement of the cylinder 5. The helical groove may be a thread or may be a lead screw. The helical groove pitch and/or lead may be varied in order to vary the brake response. By way of example, the pitch and/or lead may be such that a small rotation of the shaft 7 causes a large axial translation A of the cylinder 5 leading to a quick braking force being applied as the cylinder 5 moves quickly into the tube 2 and an eddy current force is generated. The opposite may also be the case where pitch/lead is varied to only allow a slow axial A progression, therefore resulting in a slow braking response.

FIGS. 2A to 2D illustrate an alternative embodiment where axial movement of the cylinder 5 may be driven by a ramped surface 16 about an interface 13 in the cylinder 5. As the cylinder rotates 5, the cylinder 5 is forced into the void 4 of the tube 2. In this example, no helical thread is required on the shaft 7 in order to drive movement.

FIGS. 3A to 3D illustrate an alternative embodiment where axial movement of the cylinder 5 may be influenced also by a bias mechanism such as a spring 8. The spring 8 may be used to change the characteristics of the braking action. For example, the spring 8 may be biased to draw the cylinder 5 out of the tube 2. When rotation of the cylinder 5 slows sufficiently, the spring 8 in this embodiment may act to draw the cylinder 5 from the tube 2 and thus release the braking force. In an alternative embodiment, the spring 8 may be used instead to force the cylinder 5 into the tube 2 to maintain a braking force for a longer period of time or to speed the pace within which a braking force may be applied.

Figure 4A:
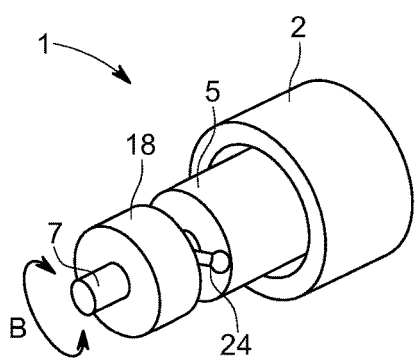
FIG. 4 illustrates a perspective view [FIG. 4A], a side view [FIG. 4B], and a front view [FIG. 4C] of an alternative embodiment of the assembly using an alternative bias mechanism.
Figure 4B:
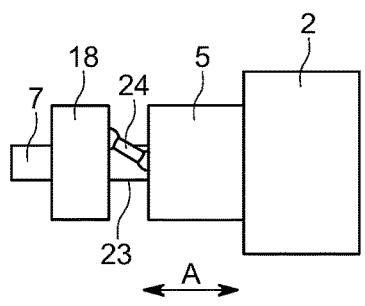
Figure 4C:
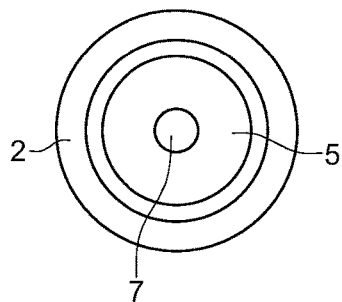

FIGS. 4A to 4C illustrate a further alternative biasing arrangement. The cylinder 5 in the assembly 1 shown may be attached to a bar or fixed cylinder section 18 with each distil end of the section 18 connected to two sides of the cylinder 5 via two bias members 23, 24. The connection points of the spring members on the cylinder 5 are offset relative to the connection points on the bar 18. When the cylinder 5 rotates, the offset reduces or disappears entirely effectively lengthening the distance between the bar 18 and cylinder 5 and forcing the cylinder 5 into the void 4. When rotation B slows or stops, the bias members 23, 24 draw the cylinder 5 back towards the bar 18 and to the offset at rest position.

FIGS. 5A to 5D show how the embodiment shown in FIGS. 2A to 2D may be combined with a bias such as a spring 8 to combine the effects of both a ramped 13 axial A displacement and a bias 8 axial A displacement.

FIGS. 6A to 6D illustrate how a centrifugal force component may also be used to change the characteristics of the assembly 1. In the example shown, a weight 11 may be connected to the cylinder 5. When the cylinder 5 rotates, the weight 11 also rotates and a centrifugal force acts on the weight in direction F. Via a kinematic relationship, centrifugal force F on the weight 11 may be translated into an axial force A on the cylinder 5 to push (or pull) the cylinder 5 into or out of the tube 2. The kinematic relationship may be via a lever arrangement 12. This means of adjusting the characteristics may be useful in certain embodiments.

Also as shown in FIGS. 6A to 6D, the shaft 7 may be attached to a spool 9 of line to which an object (not shown) such as a person may be attached. As a force is applied on the line and spool 9 in direction X such as the object falling due to gravity, line is paid out from the spool 9 causing rotation of the spool 9 and shaft 7 in direction B leading to the cylinder 5 moving into or away from the tube 2 void 4. By way of example, a person may be the object which falls from a height. Through gravity the spool 9 rotates as line is paid out from the spool 9. Rotation of the spool 9 causes rotation of the shaft 7 that in turn causes the cylinder 5 to enter the tube 2 void 4 that may be fixed in position. The differing rotational speeds of the tube 2 and cylinder 5 cause an eddy current drag force (not shown) to occur which thereby slows the fall of the person on the line.

FIGS. 7A to 7D illustrates the same centrifugal arrangement as in FIGS. 6A to 6D however with the inclusion of a bias 8 to assist with drawing in or forcing out the cylinder 5 from the tube 2 void 4.

FIGS. 8A to 8D illustrate an alternative method of forcing axial translation A to the cylinder 5 using both centrifugal force and a ramp method. When the shaft 7 rotates, the weight(s) 15 are forced to move outward in direction F thereby acting on the ramp surface 16 of the cylinder 5 causing an axial translation A of the cylinder 5. As rotation speed B decreases, the centrifugal force F acting on the weights 15 decrease and the cylinder 5 returns to a non-retracted position.

FIGS. 9A to 9D illustrate the same embodiment as in FIGS. 8A to 8D where a bias spring 8 is also used to change the axial movement A characteristics of the cylinder 5 into or out of the tube 2 void 4.

Figure 10:
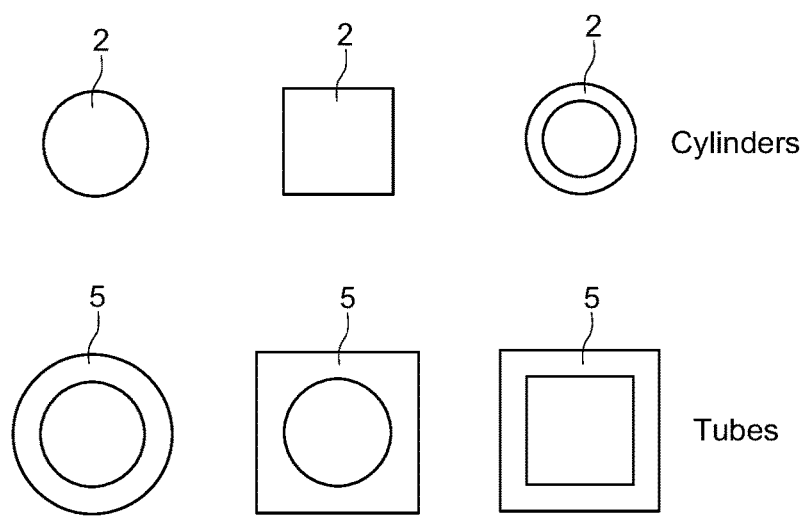
FIG. 10 illustrates alternative shapes of cylinder and tube that may be used.

FIG. 10 illustrates some further alternative tube 2 and cylinder 5 arrangements. The embodiments described above utilise a circular tube 2 with a circular void but the tube 2 may have any polygonal exterior shape such as a square shape. The tube 2 internal void shape may be circular as shown in earlier Figures could also be elliptical, square, hexagonal and so on. Similarly, earlier Figures show a circular cross-section cylinder 5 but the cylinder 5 may take various shapes and may also be hollow.

Example 2

A multilayer wall approach may also be used.

Figure 11:
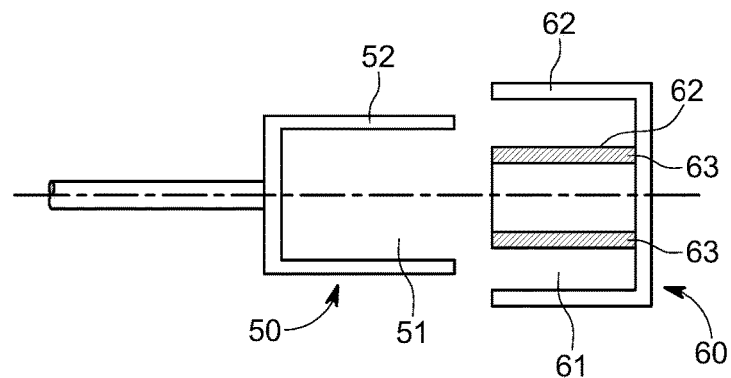
FIG. 11 illustrates a cross-section side view of a tube and cylinder design using multi-layer concentric walls.
Figure 12:
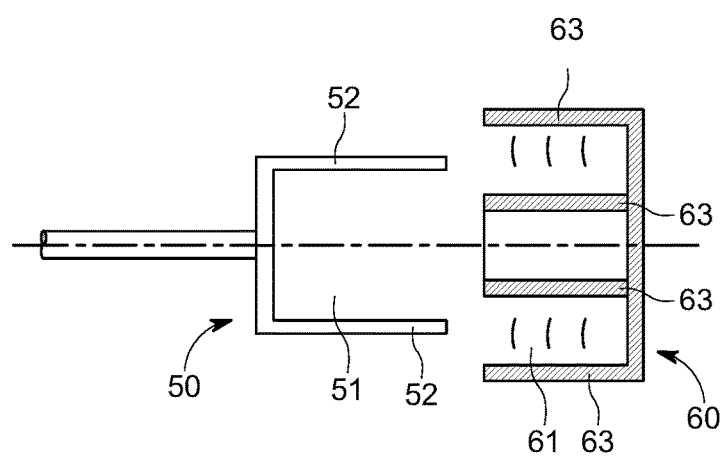
FIG. 12 illustrates an alternative cross-section side view embodiment of a tube and cylinder design using multi-layer concentric walls with varying magnet positions to that shown in FIG. 11; and, FIG. 13 illustrates a further cross-section side view multi-layered concentric wall embodiment.
Figure 13:
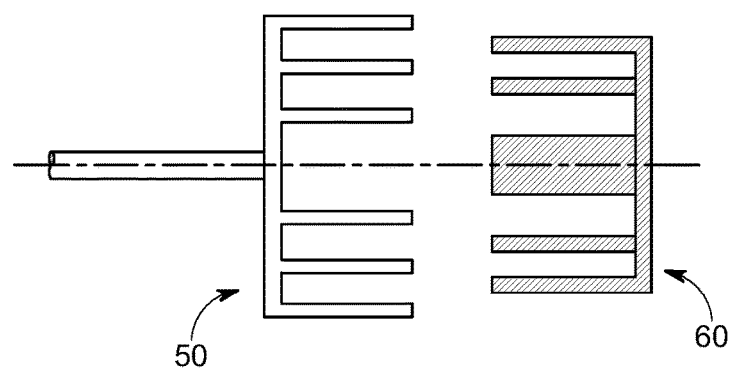

As shown in FIGS. 11 to 13, the cylinder 50 is hollow 51 and mates with a tube 60 that has a complimentary hollow 61. The overlapping walls 52, 62 of the cylinder and tube may contain magnets and/or conductive members that allow variation in eddy current tuning to occur. FIGS. 11 and 12 illustrate a multilayer tube 60 nesting with a hollowed cylinder 50 and two alternate magnet 63 configurations on the tube walls 62. FIG. 13 illustrates a multiwall 52, 62 approach where both tube 60 and cylinder 50 have multiple concentric walls 52, 62 that mate together.

Aspects of the assembly and methods of use have been described by way of example only and it should be appreciated that modifications and additions may be made thereto without departing from the scope of the claims herein.

What is claimed is:

1. An assembly comprising:
a tube including an inner and outer wall and void defined therein; and
a cylinder that fits into the tube void, the tube and cylinder, wherein
one of the cylinder and tube moves relative to the other of the cylinder and tube via two separate degrees of movement being: axial translation of one of the cylinder and tube relative to the other of the cylinder and tube so that the cylinder can pass at least partially into or out of the tube void; and rotation of one of the cylinder and tube relative to the other of the cylinder and tube about a longitudinal axis, the longitudinal axis passing through the tube void; and
the tube and cylinder are connected in a manner where a kinematic relationship exists between the tube and cylinder where relative rotation of the tube and cylinder along their axes is linked to a corresponding relative translational motion along the longitudinal axis passing though the tube and void, wherein the cylinder rotates about a shaft passing through the longitudinal axis of the cylinder and tube, and wherein the shaft has a helical groove and/or ramped surface that urges axial movement of the tube and cylinder together or apart about the longitudinal axis when the tube and cylinder have different relative speeds of rotation; and
coupled to the tube and cylinder are one or more conductive members and one or more magnetic members, or the tube and/or cylinder themselves being magnetic or conductive members, the conductive members and magnetic members or portions thereof orientated to be less than 5 mm apart when aligned so as to interact with each other so that;
when the cylinder and tube one or more conductive members and one or more magnetic members have different relative speeds of rotation to each other, the one or more one or more conductive members and one or more magnetic members interact inducing an eddy current braking force against different relative speed of motion of the tube and cylinder with a modulation of braking force arising due to a balance of the forces on the tube and cylinder caused by both rotational movement and axial movement of the tube and cylinder along the longitudinal axis to an equilibrium position of the tube and cylinder axially and rotationally to provide a controlled eddy current induced braking torque.

2. The assembly as claimed in claim 1 wherein the tube and/or cylinder is linked to a shaft which is in turn linked to a spool of line to which an object is attached and, as force is applied on the line and spool, line is paid out from the spool causing rotation of the spool and shaft leading to the cylinder moving into or away from the tube void, the differing rotational speed and axial translation of the tube relative to the cylinder causing an eddy current drag force to occur which thereby slows pay out of the line from the spool.

3. The assembly as claimed in claim 2 wherein the braking force applied to pay out of the spool of line is at a substantially constant speed for extension over a range of applied torque, the range of applied torque covering objects attached to the line weighing 9 to 150 kilograms.

4. The assembly as claimed in claim 1 wherein the tube and cylinder have a common longitudinal axis of rotation.

5. The assembly as claimed in claim 1 wherein the conductive member or members are wider than the magnetic member or members.

6. The assembly as claimed in claim 1 wherein the tube is fixed in place and the cylinder moves axially and rotationally relative to the tube.

7. The assembly as claimed in claim 1 wherein the cylinder is fixed in place and the tube moves axially and rotationally relative to the cylinder.

8. The assembly as claimed in claim 1 wherein the cylinder and tube rotate at a different relative speeds in a co-current or counter-current direction.

9. The assembly as claimed in claim 1 wherein the cylinder and tube are at least partially separate when the cylinder and/or tube are not rotating.

10. The assembly as claimed in claim 1 wherein the cylinder is at least partially inside the tube when the cylinder and/or tube are not rotating.

11. The assembly as claimed in claim 1 wherein at least part of the cylinder contains or is formed from electrically conductive material and thereby itself forms a conductive member.

12. The assembly as claimed in claim 1 wherein at least part of the tube contains or is formed from electrically conductive material and thereby itself forms a conductive member.

13. The assembly as claimed in claim 1 wherein the assembly includes a bias member that creates a direct or indirect axial force on the tube and/or cylinder, biasing the tube and/or cylinder axially together or apart on rotation of the tube and/or cylinder when the tube and cylinder have different relative speeds of rotation.

14. The assembly as claimed in claim 1 wherein axial movement of the tube and/or cylinder is caused by a translation of centrifugal energy into axial translation when the tube and cylinder have different relative speeds of rotation.

15. The assembly as claimed in claim 1 wherein the assembly includes a housing, the housing enclosing at least a portion of the assembly.

16. A fall protection safety device including an assembly as claimed in claim 1.

17. A zip line amusement ride to control the acceleration and deceleration of a suspended zip line passenger chair, comprising an assembly as claimed in claim 1.

18. The assembly as claimed in claim 1 wherein a continuous eddy current generating relationship exists with the cylinder being made entirely from a conductive member or at least the outer surface of the cylinder being made entirely from or containing a conductive member and/or the tube itself or outer surface of the tube void being made from or containing one or more magnetic members.

* * * * *